WORD ORGANIZED MAGNETIC MEMORY SELECTION AND DRIVING SYSTEM

Filed June 1, 1962 4 Sheets-Sheet 1

INVENTOR.
RICHARD L. SNYDER,
Walter J. Adam
ATTORNEY

Oct. 11, 1966 R. L. SNYDER 3,278,911

WORD ORGANIZED MAGNETIC MEMORY SELECTION AND DRIVING SYSTEM

Filed June 1, 1962 4 Sheets-Sheet 2

Oct. 11, 1966 R. L. SNYDER 3,278,911

WORD ORGANIZED MAGNETIC MEMORY SELECTION AND DRIVING SYSTEM

Filed June 1, 1962 4 Sheets-Sheet 3

WORD ORGANIZED MAGNETIC MEMORY SELECTION AND DRIVING SYSTEM

Filed June 1, 1962 4 Sheets-Sheet 4

United States Patent Office 3,278,911
Patented Oct. 11, 1966

3,278,911
WORD ORGANIZED MAGNETIC MEMORY SELECTION AND DRIVING SYSTEM

Richard L. Snyder, Malibu, Calif., assignor to Hughes Aircraft Company, Culver City, Calif., a corporation of Delaware Filed June 1, 1962, Ser. No. 200,027
5 Claims. (Cl. 340—174)

This invention relates to magnetic core memories and particularly to a simplified and improved high speed word organized core memory system.

Conventional memory systems utilize a plurality of magnetic cores arranged in rows and columns with row leads and column leads passing through or coupled to corresponding cores. Selection of the cores storing a desired word is performed by passing current pulses of a half amplitude of the minimum current amplitude required to switch the cores, through all row leads and selected column lead. The half currents combine during reading at only the cores in the selected column to provide a full amplitude switching current. However, all cores of the array are subjected to a half current pulse to cause undesired noise signals to appear on the sense leads, which noise signals are particularly undesirable during reading. Also, the amplitudes of the half current pulses must be closely adjusted to provide satisfactory operation. During writing, a half current pulse is passed through a selected column lead and half current pulses are passed through those row leads coupling cores in which a binary "one," for example, is to be written. This arrangement during writing also has the disadvantages that noise signals are generated in the sense leads and that the amplitudes of the half current pulses must be closely adjusted. Another disadvantage of these conventional memory arrays during both reading and writing is that in response to the resulting full amplitude pulses equal to the normal switching current, the switching time of the cores is relatively slow. Also, selection of these row and column leads for passing current pulses therethrough is conventionally performed by relatively complicated diode gates arranged at both ends of the row and column leads and responsive to selection pulses.

It is therefore an object of this invention to provide a magnetic memory system that utilizes an improved selection and switching arrangement to operate at a relatively high speed.

It is a further object of this invention to provide a magnetic memory system utilizing a word organized driving arrangement in which the cores are switched with a relatively large current so as to change their magnetic state in a very short interval of time and develop relatively large amplitude sense signals.

It is another object of this invention to provide a memory array in which the current selection ratio is three to one between corpes selected to be switched and those not selected to be switched.

It is still another object of this invention to provide an improved and simplified selection system for magnetic core memories that utilizes a saturating reactor in series with each word line coupling the cores.

Briefly, in accordance with this invention, a word organized memory system is provided with an improved current selection ratio for switching the cores or core elements and with saturating reactors utilized for word selection. The cores are arranged with a word line coupled to all cores of each word and a bias line coupled to cores in corresponding bit positions of each word line. During reading, a full amplitude current pulse equal in amplitude to the normal switching current of the cores is passed through a selected word line with each bias line having a half amplitude current passing therethrough so that all cores in a first or "one" state are switched rapidly to the opposite or "zero" state. The switched cores provide high amplitude sense signals in response to the current pulse of three halves normal switching amplitude while all cores in a "zero" state in the selected word line and other cores in the array are substantially undisturbed. During writing, a full amplitude current pulse is passed through the selected word line in the opposite direction from that during reading and which develops a magnetic force opposing that developed by the continuing D.C. bias current. Also a full amplitude write current pulse is passed through write lines coupled to selected cores in which a "one" is to be written to develop a magnetic force in the same direction as that developed by the current pulse passing through the word line. Thus, selected cores are rapidly switched to the opposite or "one" state, in response to current of three halves normal switching amplitude. The system for selecting the word line for both reading and writing utilizes a saturating reactor connected in series with each line. Voltage switching pulses of opposite polarity which may have initially large amplitudes are applied to opposite ends of only the selected word line to rapidly saturate the selected reactor and pass the full amplitude current pulses therethrough. Switching pulses applied to one end of unselected word lines are unable to saturate the saturating reactors therein during each switching period.

The novel features of this invention, as well as the invention itself, both as to its organization and method of operation, will best be understood from the accompanying description, taken in connection with the accompanying drawings, in which like characters refer to like parts, and in which.

Figure 1:
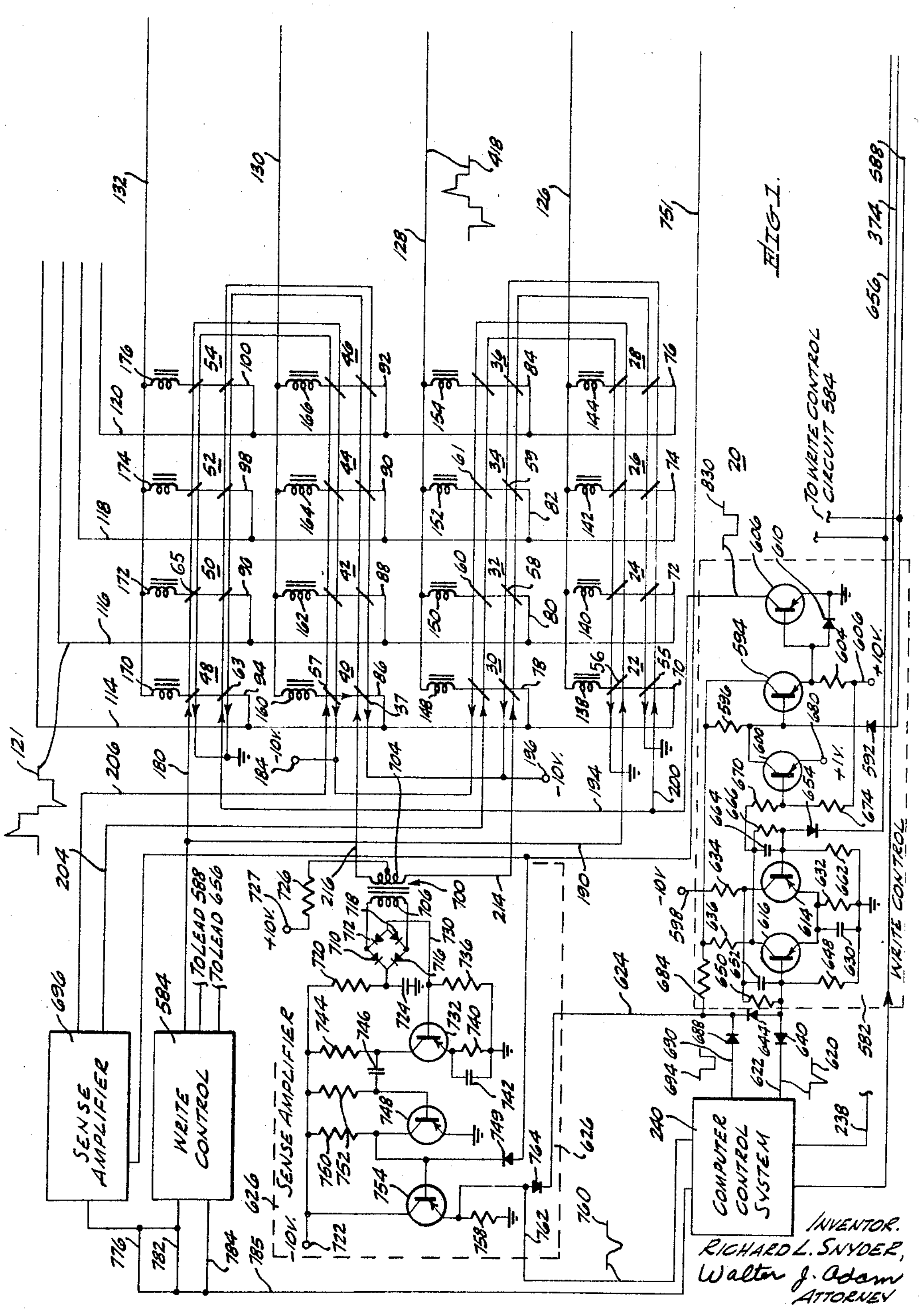
FIG. 1 is a schematic circuit diagram of a first portion of the memory system in accordance with this invention including the memory array, sense amplifier circuits and write control circuits.

Referring first to FIG. 1, a memory array 20 includes a plurality of word elements such as 22, 24, 26, 28, 30, 32, 34 and 36 in a first half of the array and a similar number of word elements such as 40, 42, 44, 46, 48, 50, 52 and 54 in a second half of the array. Each word element such as 32 may include two core elements or cores 58 and 60. The word element 34 includes core elements or cores 59 and 61. Also, the word element 22 may include cores 55 and 56, the word element 40 may include cores 37 and 57 and the word element 48 may include cores 63 and 65. It is to be noted that in accordance with the principles of this invention the cores such as 58 and 60 may be conventional toroidal cores or other type magnetic storage mediums. Each word element such as 22, 24, 26, 28, 30, 32, 34 and 36 includes respective word lines 70, 72, 74, 76, 78, 80, 82 and 84 with each word line such as 80 magnetically coupled to the corresponding cores such as 58 and 60. The word elements 40, 42,

44, 46, 48, 50, 52 and 54 include respective word lines 86, 88, 90, 92, 94, 96, 98 and 100 with each word line magnetically coupled to the corresponding cores. If the cores such as 58 and 60 are toroidal shaped, the word lines such as 80 may pass through the openings therein.

Each word line is coupled at one end to column or Y selection leads 114, 116, 118 or 120. The word lines 70, 78, 86, and 94 are coupled to the Y selection lead 114, the word lines 72, 80, 88 and 96 are coupled to the Y selection lead 116, the word lines 74, 82, 90 and 98 are coupled to the Y selection lead 118 and the word lines 76, 84, 92 and 100 are coupled to the Y selection lead 120. The other ends of the word lines are coupled to row or X selection leads 126, 128, 130 or 132 through inductive elements or saturating reactor elements. The word lines and corresponding cores may be considered arranged in groups, the word lines 70, 72, 74 and 76 forming one group, for example. The word lines 70, 72, 74 and 76 are connected to the X selection lead 126 through respective saturating reactors 138, 140, 142 and 144, and the word lines 78, 80, 82 and 84 are connected to the X selection lead 128 through respective saturating reactors 148, 150, 152 and 154. Also, the word lines 86, 88, 90 and 92 are connected to X selection lead 130 through respective saturating reactors 160, 162, 164, and 166, and the word lines 94, 96, 98 and 100 are connected to X selection lead 132 through respective saturating reactors 170, 172, 174 and 176.

The memory array 20 is shown with two cores or bit positions in each word element for convenience of illustration, but it is to be understood that in accordance with this invention any desired number of bits per word may be provided as well as an array with any desired number of word elements. A write control lead 180 which provides a full amplitude current pulse as will be explained subsequently is magnetically coupled to the core storing the first binary bit such as the core 65, the cores in the corresponding positions of the core elements 50, 52, 54, 46, 44, 42 and the core 57 of the word element 40, being connected thereat to a negative terminal 184 which may have −10 volts applied thereto. Another write control lead 190 is magnetically coupled to the core in the first bit position of each word element such as the core 56 of the word element 22 and the corresponding cores of the word elements 24, 26, 28, 36, 34, 32 and 30 being connected thereat to the −10 volt terminal 184. A write control lead 194 is magnetically coupled to the core 63 of the second bit position of the word element 48 and the corresponding cores of the word elements 50, 52, 54, 46, 44, 42, and the core 37 of the word element 40, being connected at that end to a suitable source of potential such as a −10 volt terminal 196. Also, a write control lead 200 is magnetically coupled to the cores in the second bit position in the first half of the array such as the core 55 of the word element 22 and the corresponding cores of the word elements 24, 26, 28, 36, 34, 32, and 30, being connected to the −10 volt terminal 196 at that end.

Sensing of information for the first bit position in each half of the array 20 is performed by sense leads 204 and 206 with the sense lead 204 being wound from a first end through or magnetically coupling the cores in the first bit position of the word elements 30, 32, 34, 36, 28, 26, 24, and the core 56 of the word element 22, being connected at that end to a suitable reference potential such as ground. The sense lead 206 is wound from a first end through or magnetically coupling the core 57 of the word element 40 and the corresponding cores of the word elements 42, 44, 46, 54, 52, 50 and the core 65 of the word element 48, being connected to a suitable source of reference potential such as ground at that end. A pair of sense leads 214 and 216 carry interrogated signals from the second bit positions of each word element with the sense lead 214 wound from a first end through or magnetically coupled to the cores in the second bit position of the word elements 30, 32, 34, 36, 28, 26, 24 and the core 55 of the word element 22, being connected to ground thereat. The sense lead 216 is wound from a first end through or magnetically coupling the core 37 of the word element 40 and the corresponding cores of the word elements 40, 42, 44, 46, 54, 52, 50 and the core 63 of the word element 48, being connected to ground at that end. It is to be noted at this time that the sense leads also perform the function of conducting a D.C. bias current.

Figure 2:
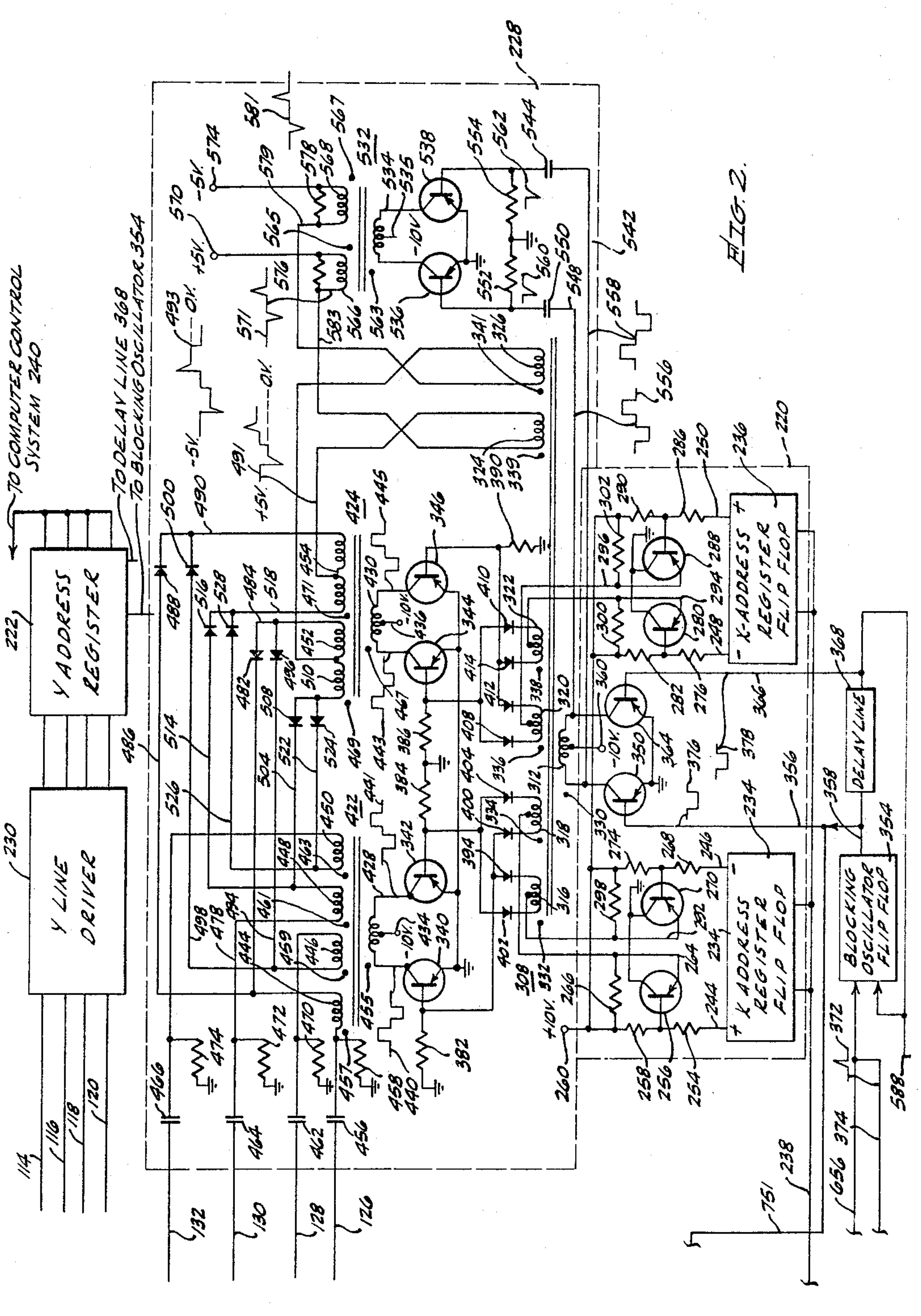
FIG. 2 is a schematic circuit diagram of a second portion of the memory system in accordance with this invention to be connected to FIG. 1 and including address registers and driving circuits.

For reading and writing in accordance with this invention, an X address register 220 as shown in FIG. 2 and a Y address register 222 are provided respectively controlling an X line driver circuit 228 and a Y line driver circuit 230 which function as voltage pulse forming networks. The X address register 220 includes first and second flip flop circuits 234 and 236, each having a first and a second input lead coupled through a plurality of leads indicated as a composite lead 238 to a source of address signals such as a computer control system 240. The flip flops 234 and 236 respond to input signals to be each set to a first or a second binary state as is well known in the art and apply a signal at a high voltage level and a signal at a low voltage level to different ones of output leads 244 and 246 and output leads 248 and 250.

The lead 244 is coupled through a resistor 254 to the base of a pnp type transistor 256 operating as an emitter follower as well as through a resistor 258 to a suitable source of potential such as a +10 volt terminal 260. The transistor 256 has a collector coupled to ground and an emitter coupled to a lead 264. A resistor 266 may be coupled between the lead 264 and the +10 volt terminal 260. Similarly, the lead 246 is coupled through a resistor 268 to the base of a pnp type transistor 270, operating as an emitter follower, as well as through a resistor 274 to the +10 volt terminal 260. The lead 248 is coupled through a resistor 276 to the base of a pnp type transistor 280 as well as through a resistor 282 to the terminal 260 and the lead 250 is coupled through a resistor 286 to the base of a pnp type transistor 288 as well as through a resistor 290 to the terminal 260. The transistors 280 and 288 also operate as emitter followers. The collector of the transistors 270, 280 and 288 are coupled to ground and the emitters are respectively coupled to leads 292, 294 and 296. Resistors 298, 300 and 302 are provided similar to the resistor 266.

A transformer 308 is provided including a primary winding 312 inductively coupled to a plurality of secondary windings 316, 318, 320, 322, 324, and 326, all wound with a similar polarity relation as indicated by dots 330, 332, 334, 336, 338, 339 and 341. The transformer 308 in response to timing pulses of waveforms 376 and 378 applied to the winding 312 biases a transistor 340 or 342 and a transistor 344 or 346 in a sequence as selected by the flip flops 234 and 236. One end of the winding 312 is coupled to the collector of a pnp type transistor 350 having an emitter coupled to ground and a base coupled to a blocking oscillator 354 through leads 356 and 358. The winding 312 has a center tap coupled to a −10 volt terminal 360 so as to operate in a push-pull arrangement. The other end of the winding 312 is coupled to the collector of a pnp type transistor 364 having an emitter coupled to ground and a base coupled through a lead 366 to a delay line 368. The read and write timing control of the driving operation is performed by the blocking oscillator 354 responding to an initiate pulse of a waveform 372 applied thereto from the computer control system 240 through a lead 374. The timing signal of the waveform 376 is applied to the lead 356 and a delayed timing signal of a waveform 378 is applied to the lead 366. Selection of a lead such as 128 is performed by the flip flops 234 and 236 applying a negative potential to the center taps of the windings 316 or 318 and the windings 320 or 322. The reading and writing sequence is controlled by the timing pulse of the waveforms 376 and 378 controlling the transistors 350 and 364 to apply opposite polarity pulses to the ends of the primary winding 312, which in turn determines the polarity relations of the pulses at all secondary windings of the transformer 308.

For selection of the X driving or selection lead, the lead 264 is coupled to the center tap of the secondary winding 318, the lead 292 is coupled to the center tap of the winding 316, the lead 294 is coupled to the center tap of the winding 322 and the lead 296 is coupled to the center tap of the winding 320.

The transistors 340, 342, 344 and 346 all of the pnp type are provided to respond to the selection and polarity relation of the pulses applied to the transformer 308. The transistor 340 has an emitter coupled to ground and a base coupled through a bias control resistor 382 to ground, the transistor 342 has an emitter coupled to ground and a base coupled through a bias control resistor 384 to ground, the transistor 344 has an emitter coupled to ground and a base coupled through a bias control resistor 386 to ground and the transistor 346 has an emitter coupled to ground and a base coupled through a bias control resistor 390 to ground. To control the sequence of conduction of the transistors, the base of the transistor 340 is also coupled through the anode to cathode path of a diode 394 to a first end of the winding 316 and through the anode to cathode path of a diode 400 to a first end of the winding 318 and the base of the transistor 342 is also coupled through the anode to cathode path of a diode 402 to the second end of the winding 316 and through the anode to cathode path of a diode 404 to the second end of the winding 318. The base of the transistor 344 is also coupled through the anode to cathode path of a diode 408 to a first end of the winding 320 and through the anode to cathode path of a diode 410 to a first end of the winding 322 and the base of the transistor 346 is coupled through the anode to cathode paths of diodes 412 and 414 to the second ends of respective windings 320 and 322.

A transformer 422 has a primary winding 428 coupled between the collectors of the transistors 340 and 342 and a transformer 424 has a primary winding 430 coupled between the collectors of the transistors 344 and 346. The windings 428 and 430 have center taps coupled to respective suitable sources of potential such as −10 volt terminals 434 and 436 so as to provide a push-pull operation. Thus, when one of the transistors such as 340 and 342 is conductive, a positive pulse shown by the waveform 440 is applied to the collector of the transistor 340 and a negative pulse as shown by a waveform 441 is applied to the collector of the transistor 342, for example. Also, when one of the transistors 344 and 346 is conductive, a positive pulse for example shown by a waveform 443 is applied to the collector of the transistor 344 and a negative pulse is applied to the collector of the transistor 346 as shown by a waveform 445.

Application of a switching pulse to a selected X selection lead also requires secondary windings 444, 446, 448, and 450 of the transformer 422 and secondary windings 452 and 454 of the transformer 424. The polarity relation of the windings of the transformers 422 and 424 is respectively indicated by dots 455, 457, 459, 461 and 463, and by dots 467, 469, and 471. The winding 444 has a first end coupled through a coupling capacitor 456 to the lead 126 as well as through a biasing resistor 458 to ground. Similarly, the windings 446, 448 and 450 have a first end respectively coupled to respective leads 128, 130 and 132 through coupling capacitors 462, 464, and 466 as well as to ground through respective biasing resistors 470, 472 and 474. The second end of the winding 444 is coupled to a lead 478 and through the cathode to anode path of a diode 482 to a lead 484 which in turn is coupled to a first end of the winding 452. The second end of the winding 444 is also coupled to a lead 486 and through the anode to cathode path of a diode 488 to a lead 490 which in turn is coupled to a first end of the winding 454. The second end of the winding 446 is coupled to a lead 494 and through the cathode to anode path of a diode 496 to the lead 484 as well as to a lead 498 and through the anode to cathode path of a diode 500 to the lead 490.

The second end of the winding 448 is coupled to a lead 504 which in turn is coupled through the cathode to anode path of a diode 508 to a lead 510 which is coupled to a second end of the winding 452. Also, the second end of the winding 448 is coupled through a lead 514 and the anode to cathode path of a diode 516 to a lead 518 which in turn is coupled to a second end of the winding 454. The second end of the winding 450 is coupled through a lead 522 and the cathode to anode path of a diode 524 to the lead 510 and through a lead 526 and the anode to cathode path of a diode 528 to the lead 518.

For providing an initial spiked portion of the switching pulses such as the waveform 418 to rapidly saturate the reactor in a selected word line of the memory array 20, a transformer 532 is provided with a primary winding 534 having a first and second end coupled to the collectors of respective pnp type transistors 536 and 538, both transistors having emitters coupled to ground. The collector of the transistor 350 is coupled through a lead 542 and a capacitor 544 to the base of the transistor 538 and the collector of the transistor 364 is coupled through a lead 548 and a capacitor 550 to the base of the transistor 536. The bases of the transistors 536 and 538 are also coupled to ground through respective resistors 552 and 554 so that pulses of waveform 556 and 558 are differentiated as shown by waveforms 560 and 562. The winding 534 has a center tap coupled to a suitable source of potential such as −10 volt terminal 535. Secondary windings 566 and 568 of the transformer 532 are provided with a first end of the winding 566 coupled to a +5 volt terminal 570 and a second end coupled through a lead 583 and the reversing winding 324 to a center tap of the winding 454. The winding 568 has a first end coupled to a −5 volt terminal 574 and a second end coupled through a lead 579 and the reversing winding 326 to a center tap of the winding 452. The polarity relations of the primary and secondary windings of the transformer 568 is indicated by dots 563, 565 and 567. Biasing resistors 576 and 578 are coupled between the first and second ends of respective windings 566 and 568.

Spiked pulses of the waveforms 571 and 581 are developed in the leads 579 and 583. The terminals 570 and 574 determine the reference level of the pulses of the waveforms 491 and 493 applied to the center taps of respective windings 454 and 452.

In the system in accordance with this invention, a write control circuit as shown in FIG. 1 is included to provide a reversing current when a binary "one" state is desired to be written into a core. The write portion of a cycle occurs during the second pulse such as shown by the positive pulse of the waveform 418. A write control flip-flop circuit 582 controls the cores in the second binary position of a selected word element and a write control circuit 584 controls the core in the first binary position of the selected word element. Because the write control circuits 582 and 584 are similar, only the write control circuit 582 will be described in detail. The delayed timing pulse determining the write portion of the cycle as shown by the waveform 378 (FIG. 2) is applied through a lead 588 to the blocking oscillator 354 as a reset signal and through the anode to cathode path of a diode 592 to the base of a pulse forming transistor 594. The base of the transistor 594 is coupled both through a resistor 596 to a −10 volt terminal 598 as well as to the collector of a transistor 600. The emitter of the transistor 594 is coupled through a resistor 604 to a +10 volt terminal 606 as well as to the base of a pulse forming transistor 606. The base of the transistor 606 is coupled to ground through the anode to cathode path of a diode 610, the emitter is coupled to ground and the collector is coupled to the write leads 200 and 194 for applying a write pulse of a waveform 830 through the second bit position of each word. The transistors 594, 600 and 606 are all of the pnp type, for example.

The write control circuit 582 also includes transistors 614 and 616 of the pnp type which form a flip flop circuit that responds to an input signal of a waveform 620 applied to a lead 622 from the computer control system 240 or responds to a recirculating signal applied through a lead 624 from a sense amplifier 626. Also, the flip flop circuit including the transistors 614 and 616 is reset by the initiate pulse of the waveform 372 biasing the transistor 614 into conduction. The transistors 614 and 616 have emitters coupled through a parallel arranged capacitor 630 and resistor 632 to ground and collectors coupled to the −10 volt terminal 598 through respective resistors 634 and 636. The base of the transistor 616 is coupled to the lead 622 through the anode to cathode path of a gating diode 640 for responding to information applied from the computer control system 240. The base of the transistor 616 is also coupled to the lead 624 through the anode to cathode path of a gating diode 644 for being triggered into conduction during a regenerative operation. The base of the transistor 616 is also coupled to ground through a resistor 648 and to the collector of the transistor 614 through a parallel arranged resistor 650 and capacitor 652.

The base of the transistor 614 is coupled through the anode to cathode path of a diode 654 and through a lead 656 to the lead 374 for resetting the flip flop 354 in response to the initiate pulse of the waveform 372. The base of the transistor 614 is also coupled through a resistor 662 to ground and through a parallel arranged capacitor 664 and resistor 666 to the collector of the transistor 616. To control the transistor 600, the collector of the transistor 616 is coupled through a resistor 670 to the base of the transistor 600 which in turn is coupled to one end of a resistor 674 having the other end coupled to the +10 volt terminal 606. The emitter of the transistor 600 is coupled to a +1 volt terminal 680 and the collector is coupled to the base of the transistor 594.

In order to provide a regeneration or recirculation gate, the lead 624 is coupled through a resistor 684 to the −10 volt terminal 598 as well as through the cathode to anode path of a diode 688 to a lead 690. A regenerate gating signal at the lower voltage level of a waveform 694 is applied to the lead 690 from the computer control system 240 when the information is to be written into the second bit position of a previously interrogated core as read by the sense amplifier 626.

The sense amplifier 626 for sensing the interrogated signal of the second bit position of a selected word is similar to a sense amplifier 696 for sensing the interrogated signal of the first bit position of a selected word. The sense amplifier 696 is coupled to the sense leads 204 and 206 and the sense amplifier 626 is coupled to the sense leads 214 and 216. Because both of the sense amplifiers 626 and 696 are similar, only the sense amplifier 626 will be explained in detail. A transformer 700 is provided with first winding 704 having opposite ends coupled to the leads 214 and 216 and a second winding 706 having a first end coupled to the anode of a diode 710 and to the cathode of a diode 712 and having a second end coupled to the anode of a diode 716 and to the cathode of a diode 718, the diodes forming a full wave bridge rectifier circuit. The cathodes of the diodes 710 and 716 are coupled through a resistor 720 to a suitable source of potential such as a −10 volt terminal 722 as well as to ground through a bypass capacitor 724. The winding 704 operates in a push-pull manner as a center tap is coupled through a resistor 726 to a suitable source of potential such as a +10 volt terminal 727. The current flowing from the terminal 727 through the resistor 726 provides through the sense leads 214 and 216 a D.C. (direct current) half amplitude bias current to the cores of the array 20, as will be explained subsequently.

The sensed signal on the leads 214 or 216 is applied from the anodes of the diodes 712 and 718 to a lead 730 and to the base of a pnp type transistor 732. The base of the transistor 732 is coupled to ground through a biasing resistor 736 and the emitter is coupled to ground through a parallel arranged resistor 740 and capacitor 742. The collector of the transistor 732 is coupled through a signal forming resistor 744 to the −10 volt terminal 722 and through a coupling capacitor 746 to the base of a pnp type transistor 748 having an emitter coupled to ground and a collector coupled through a resistor 750 to the terminal 722. The base of the transistor 748 is also coupled through a biasing resistor 752 to the terminal 722.

The collector of the transistor 748 is coupled to the base of a pnp type transistor 754 operating as an emitter follower and having an emitter coupled through a signal forming resistor 758 to ground and a collector coupled to the terminal 722. The collector of the transistor 748 is also coupled through the cathode to anode path of a diode 749 to the lead 751 for responding to the read timing signal of the waveform 376. The amplified sense signal as shown by a waveform 760 is applied from the emitter of the transistor 754 through a lead 762 to the computer control system 240 to be utilized therein as is well known in the art. The sensed signal on the lead 762 is also applied through the anode to cathode path of a diode 764 to the lead 624 for rewriting the information into the interrogated core in response to a regenerate signal of the waveform 694.

The sense amplifier 696 has an output lead 776 for applying signals representative of the binary information stored in the first bit position of the selected word to the computer control system 240 through a composite lead 785. A regenerate gate signal is also applied to the write control circuit 584 through a lead 782 and an input signal is applied on a lead 784. The lead 751 is also coupled to the sense amplifier 696 for applying the read timing pulse of the waveform 376 thereto and the leads 588 and 656 are coupled to the write control circuit 584.

Figures 3, 4:
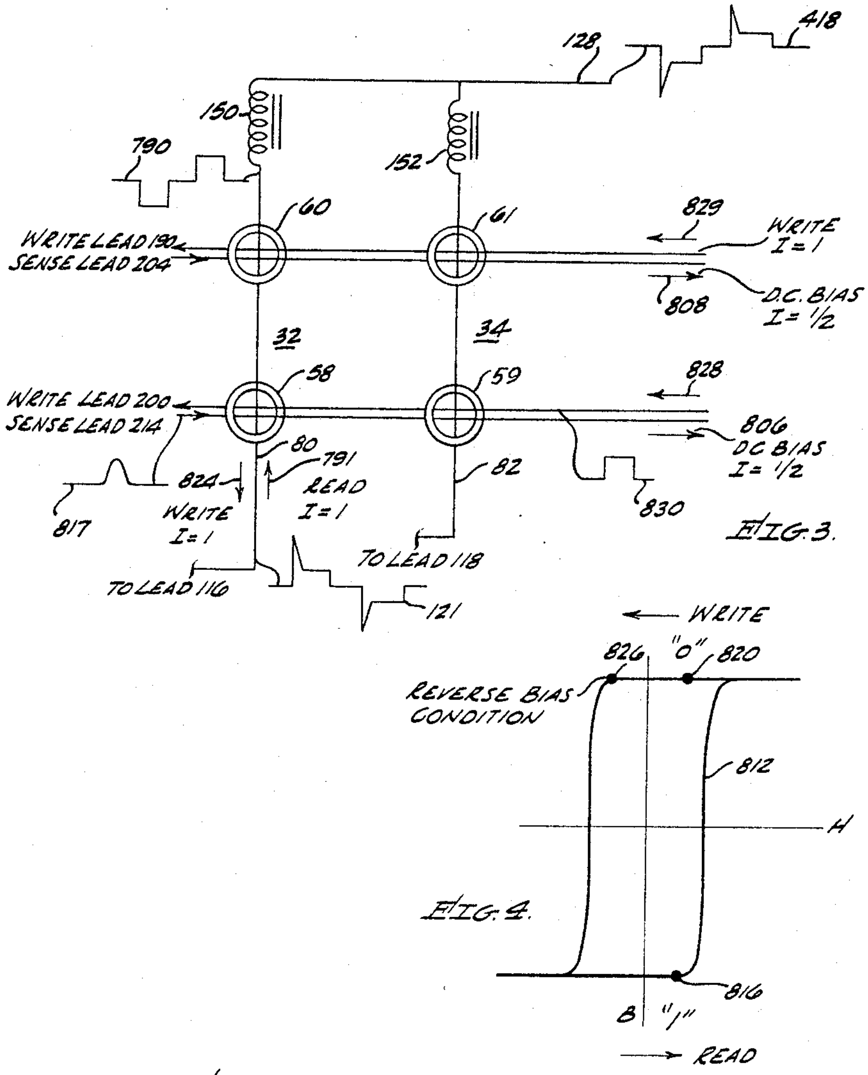
FIG. 3 is a schematic circuit diagram of a portion of the memory array of FIG. 1 for further explaining the current selection ratio and the saturating rectors in accordance with this invention.
FIG. 4 is a diagram of flux density B versus field H showing the hysteresis loop of the cores utilized in the system of FIGS. 1 and 2.

Referring now to FIG. 3, which is a detail of the word elements 32 and 34 of FIG. 1, the current selection ratio in accordance with this invention will be first explained. During reading, the first portions including the transient spike portions of the driving pulses of the waveform 418 and of the waveform 121 are applied to the respective selection leads 128 and 116 to the word line 80 to initially rapidly saturate the saturating reactor 150 and pass a current pulse of a waveform 790 through the word line 80 in a direction indicated by an arrow 791. The unselected saturating reactors such as 152 which have a pulse at a single end thereof or a half voltage thereacross do not saturate in the time period of the reading operation or the writing operation as determined by the width of the respective read and write pulses of the waveforms 418 and 121. As shown in FIG. 1, the reactors 148, 152, 154, 140, 162 and 172 all have a half voltage applied to one end when selecting the word element 32, but do not saturate in the time period of the read pulse.

In response to the read selection pulses of the waveforms 121 and 418, the cores which are in a binary "one" state at a point 816 of the hysteresis curve 812 of FIG. 4 are switched to the upper level in response to a switching current equal to three halves of the normal switching amplitude. The magnetic forces developed by the current pulse of the waveform 790 and the D.C. current of the arrow 806 are in the same direction as that required to produce an opposite state of magnetization. Upon removal of the read pulse, the state of the core moves back to the stable "zero" condition of a point 820 as determined by the magnetic flux developed by the D.C. bias current flowing through the sense leads 204 and 214 as indicated by arrows 806 and 808. It is to be noted that during the read cycle a core such as 60 storing a "zero" condition is driven further to the right on the curve 812 from the point 820 but returns to the point 820 at the termination of the pulses of the waveforms 121 and 418. A core in a "one" state such as the core 58 induces a sense signal of a waveform 817 on the sense lead 214.

During the write portion of the cycle, that is, during the occurrence of the negative pulse including the spike of the waveform 121 and the positive pulse including the spike of the waveform 418, the word element such as 32 is again selected by the full voltage applied across the saturating reactor 150 which rapidly saturates to pass a current pulse of the waveform 790 therethrough in a direction indicated by an arrow 824. Thus, the cores 58 and 60 are both reverse biased to a point 826 of FIG. 4, the full amplitude current indicated by the arrow 824 effectively overcoming the half current of the D.C. bias currents of the arrows 806 and 808 and moving the magnetic state an equivalent half current distance to the left of the axis. If a "one" is to be written into a core, such as 58, a full amplitude write current shown by a waveform 830 is applied in the direction of an arrow 828 to the lead 200 to switch the core to the lower state of the hysteresis curve 812 of FIG. 4. The total switching current is three halves normal amplitude so that the core 58 is rapidly switched to the opposite magnetic state. A similar current pulse is passed through the write lead 190 in the direction indicated by an arrow 829 if a "one" is desired to be written into the core 60. Upon removal of the write current pulse such as that of the waveform 830 and removal of the pulse of the waveform 790, the magnetic state of the core 58 moves to the point 816 of FIG. 4 and a core such as 60 in which a "one" is not written therein returns to the point 820. The magnetomotive force developed by the D.C. bias current indicated by the arrows 806 and 808 maintains the cores 58 and 60 in the stable magnetic states such as 816 and 820.

The saturating reactors such as 150 and 152 have the characteristics that when a relatively large voltage is applied thereacross, they change to a saturated low impedance condition in a very short period of time. The saturation of the reactor from a given remote point on the hysteresis loop requires a fixed number of volt seconds. The saturating reactors saturate in a period of time which decreases with increasing potential applied thereacross. The saturating reactors in accordance with this invention may be a conductor and any magnetic material, preferably a ferromagnetic material having a low coercivity. When the saturating reactor 150 is saturated to a low impedance condition during the read portion of the cycle, the read current as shown by the arrow 791 flows through the word line 80 to apply magnetic lines of flux to the cores 58 and 60. During writing, the full voltage of the combination of selection pulses of the waveforms 418 and 121 rapidly saturates the saturating reactor 150. The combination of the write select current of the waveform 790 in the direction of the arrow 824 and the write current of the waveform 830 in the direction of the arrow 828 develops a combined magnetomotive force to switch the core from the point 820 to the point 816.

Figure 6:
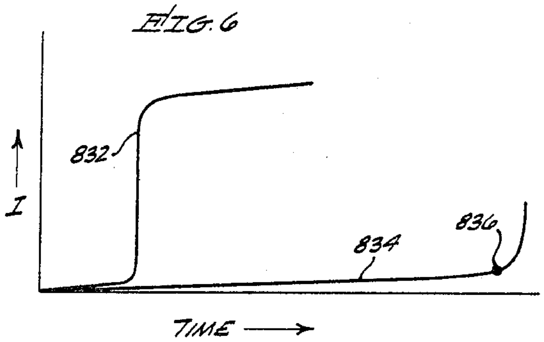
FIG. 6 is a graph of current versus time for further explaining the operation of the saturating reactor switching arrangement in accordance with this invention.

As shown by a curve 832 of FIG. 6, a voltage pulse applied to both ends of a reactor such as the saturating reactor 150 causes the current to rise after a relatively short time interval. The spiked portion of the pulses of the waveforms 121 and 418 causes the selected saturating reactor to rapidly saturate while not providing sufficient voltage to saturate the unselected reactors in the time interval of the total pulse. However, if the voltage pulse is applied to only one end, such as to the saturating reactor 152, a relatively long time interval occurs as shown by a curve 834 before the core is saturated and appreciable current flows therethrough. The pulses of the waveforms 121 and 418 are selected of sufficiently short duration so that they are terminated substantially before the current rises above approximately the point 836. This selected time takes into consideration the increased saturation effect of the spiked portions and the steady state portions of the voltage pulses. Thus, only the cores of the selected word element receive sufficient current to even partially overcome the D.C. half current of the arrows 806 and 808. The saturating reactors function in a similar manner during both reading and writing with only the selected reactor such as 150 changing to the saturated low impedance condition during the time duration of the select pulses of the waveforms 121 and 418. However, all unsaturated reactors are returned to their initial state by the writing signal.

Referring now to FIGS. 1 and 2, the general operation of the source of word line selection pulses will be explained. The address register flip-flops 234 and 236 are initially set by signals applied from the computer control system 240 through the composite lead 238 to the input leads thereof. For example, the flip-flop 234 may be triggered to a state to apply a positive signal to the lead 244 and a negative signal to the lead 246 and the flip-flop 236 may be triggered in a state to apply a negative signal to the lead 248 and a positive signal to the lead 250. In this example, as determined by the above states of the flip-flops 234 and 236, pulses of the waveform 418 will be applied to the lead 128. The flip-flop 234 provides selection of either the winding 316 or the winding 318 by applying a negative voltage to the center tap of one or the other. The flip-flop 236 selects either the winding 320 or the winding 322 by also applying a negative voltage to the center tap of one of the two windings. The selected winding 316 or 318, that is the most negative winding, biases the connected diodes either 394 and 402 or 400 and 404 nearly to conduction whereas the diodes connected to the unselected winding are biased sufficiently positive to be far from conduction. By this means the sequence of energizing the transistors 340 and 342 in response to the two pulses of the waveforms 376 and 378 is determined. This sequence combined with those of the other bit positions such as represented by the sequence of energizing the transistors 344 and 346 determine which of the driver secondary windings 444, 446, 448 or 450 conducts during a cycle. The signal developed during the first phase or read phase of the cycle across the selected winding such as 316 acts on the least biased diodes 402 and 394 to bias the diode 402 into conduction and drive the transistor 340 into conduction so that a signal of a selected polarity is developed across the windings 444, 446, 448 and 450. The polarity relation is shown by the pulses of the waveforms 440 and 441 applied to the collectors of respective transistors 340 and 342. During the write portion of the cycle, the transistor 342 is biased into conduction. Similarly, the potential developed across the selected winding 322 in response to the pulses of the waveforms 556 and 558 drives the diode 412 into conduction and in turn the transistor 346 into conduction during the read portion of the cycle to develop a voltage of a selected polarity across the windings 452 and 454. During the write portion of the cycle, the transistor 344 is biased into conduction. The polarity relations developed across the secondary windings of the transformer 422 and the secondary windings of the transformer 424 effectively select during reading and during writing a single one of diodes 488, 500, 516, 528, 482, 496, 508 or 524 for being biased into conduction. However, an additional operation is required by applying a required potential to the center tap of either the winding 452 or 454, which is performed by the action of the transformer 532 and the signal reversal of the windings 324 and 326. This is essentially a dynamic bias which combined with the bias potentials from the terminals 570 and 574 and the spike generated across windings 568 and 566 bring the selected windings 452 or 454 into potentials which will make their connected diodes conduct.

During the read portion of the cycle, the pulses of the waveforms 558 and 556 transferred to the windings 324 and 326 in combination with the pulses of the waveforms 571 and 581 provides a potential to the center tap of the winding 454 as shown by the waveform 491 having a reference level of +5 volts and the negative pulse falling to approximately ground at the steady state portion. A potential is applied to the center tap of the winding 452 as shown by the waveform 493 having a −5 volt reference level and a negative steady state pulse of approximately −10 volts to bias the winding 452 sufficiently negative to prevent conduction of diodes coupled thereto. The differentiated signal of the waveform 560 biased the diode 536 into conduction to develop the pulses of the waveforms 571 and 581 which are applied to the windings 324 and 326. Because of the arrangement of the secondary windings of the transformers 422 and 424, only the diode 500 is forward biased and goes into conduction. Thus, the signal of the waveform 491 combined with the signal developed across the winding 446 forms the negative portion of the X selection pulse of the waveform 418.

During the second or write phase of the cycle cited in the example, all transformer secondary voltages reverse. The reversing operation of the windings 324 and 366 combined with the D.C. bias of the terminal 570 establishing the reference level of the waveform 491 biases all of the diodes connected to the winding 454 so far in the reverse direction that they cannot conduct. The positive pulse of the waveform 493 biases the center tap of the winding 452 approximately at ground so that the diodes coupled thereto are close to conduction.

The diode 496 is driven into conduction by the additive voltages on the right side of winding 452 as shown by the pulses of the waveforms 443 and 445 and all of the voltage developed across the winding 446 similar to the pulses of the waveforms 440 and 441. The positive spike of the waveform 581 is applied to the winding 326 as the transistor 538 is biased into conduction in response to the differentiated pulse of the waveform 562. All other diodes are not subject to sufficient forward voltage to cause conduction. Thus, the second pulse or write portion of the pulse 418 is applied to the selection lead 128.

It is to be noted that the system in accordance with this invention may operate without the spike pulses of the waveforms 571 and 581 added to the driving signal of the waveform 418. An essentially square pulse will be formed by the circuit of FIG. 2 if the differentiated pulse is not utilized and the selected saturating reactor will saturate in a relatively short period of time, although not as rapidly as with driving pulses of the waveform 418. The Y address register 222 and the Y line driver 230 simultaneously function in a similar manner to develop the driving signal of the waveform 121 on the selected lead 116.

Figure 5:
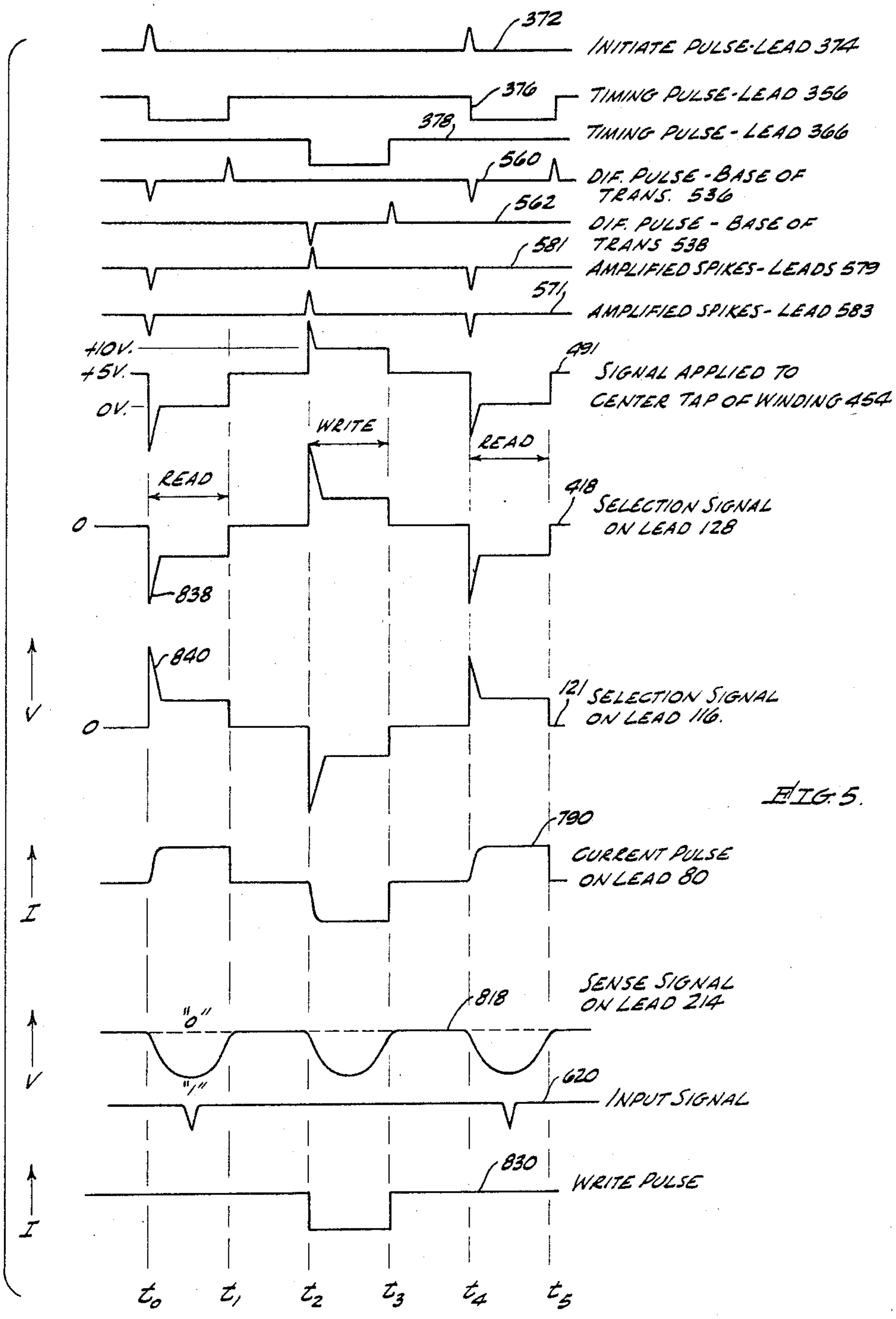
FIG. 5 is a diagram of waveforms for explaining the operation of the system of FIGS. 1 and 2 in accordance with this invention.

To generally describe the operation of the sense amplifier 626, the transformer 700 is provided with a center tap coupled through the resistor 726 to the +10 volt terminal 727. The half amplitude D.C. bias current such as indicated by the arrows 806 and 808 of FIG. 3 continually flows from the terminal 727 through the winding 604 and through the leads 194 and 200. A similar D.C. bias current is applied from the sense amplifier 696 to the leads 204 and 206. In response to the switching pulses of the waveforms 121 and 418, signals induced in the leads 214 and 216, similar to the waveform 817 of FIG. 3, are applied through the transformer 700 to the full wave rectifier arrangement, including the diodes 710, 716, 712 and 718. A negative signal of the waveform 818 of FIG. 5 is applied through the lead 730 to the base of the transistor 732 which in turn develops a positive signal at the collector thereof, which signal is applied to the base of the transistor 748. In response to the decreased conduction of the transistor 748, a more negative signal is applied to the base of the transistor 754, decreasing the conduction thereof and developing a negative going signal of the waveform 760 on the lead 762. Reading is only performed in response to the read timing pulse of the waveform 376 applied from the lead 751 to the anode of the diode 749 to bias that diode out of conduction. The signal of the waveform 760 may be applied to the computer control system 240 to be utilized therein, as is well known in the art. Also, the sensed signal of the waveform 760 may be applied through the diode 764 for being rewritten into the previously interrogated core. A similar arrangement such as the sense amplifier 696 is provided for each bit position of the word elements.

The writing phase of the operation will now be further described by considering the function of the write control flip-flop circuit 582. The initiate pulse of the waveform 372 applied through the lead 656 to the cathode of the diode 654 biases that diode out of conduction and in turn resets the flip flop by biasing the transistor 614 into conduction and the transistor 616 out of conduction. This reset condition is the state which will cause the writing of a binary "zero" into a selected core during the write cycle as determined by the timing pulse of the waveform 378. When the transistor 614 goes into conduction, the collector of the transistor 614 goes positive which causes the collector of the transistor 616 to go negative. Because the collector of the transistor 616 is negative, the base of the transistor 600 is negative to bias the transistor 600 into conduction and clamp the collector thereof substantially to ground. The base of the emitter follower transistor 594 is therefore at ground potential and will remain so, keeping the write driver transistor 606 biased out of conduction. Thus, the passage of a write "one" current through the write conductors such as 200 is prevented.

If the external system or computer control system 240 is to introduce new information, the regenerate gate including the diode 688 will be closed when the gating signal of the waveform 694 is at the upper level, decoupling the diode 644 and allowing information or negative signals for writing a "one" to pass through the diode 640. When a "zero" is to be written into a selected core, a signal such as the waveform 620 is not applied to the input lead 622, so that the diode 640 remains non-conductive and the flip flop remains in the reset state with the transistor 614 conducting. For writing a binary "one," a negative pulse of the waveform 620 will be applied to the input of the lead 622 shortly after the formation of the initiate pulse of the waveform 372, that is, before the start of the write phase of the operation. The pulse of the waveform 620 is applied through the diode 640 and triggers the write control flip flop into the "one" state with the transistor 616 biased into conduction and the transistor 614 being biased non-conductive. The collector of the transistor 616 then goes positive. This condition acting through the resistors 670 and 674 biases the transistor 600 out of conduction allowing the current flowing through the resistor 596 to pass through the diode 592, which is biased at the anode in response to the write timing pulse of the waveform 378 applied to the lead 558. Thus, current flowing through the resistor 596 is allowed to drive the emitter follower transistor 594 into conduction. The write driver or pulse forming transistor 606 is thus biased into conduction passing a write "one" current pulse through the writing conductors 200 and 194 as shown by the waveform 830 of FIG. 3.

When the regenerate gate, including the diode 688, is opened by a signal of the waveform 694 going negative, the diode 644 is biased into conduction and input signals are not applied to the lead 620 as determined by the computer control system 240 so that the diode 640 is biased out of conduction. In this condition, the presence or absence of negative signals of the waveform 760 developed by the sense amplifier 626 controls the write control flip flop 582 to remain at the reset state to write a "one" if a "one" has been read during the read phase of the cycle and to be set to a state to write a "zero" if a "zero" has been read during the read phase. The presence of the negative signal of the waveform 760 applied to the cathode of the diode 644 biases the transistor 616 into conduction to write a "one" similar to that discussed above. Thus, upon application of the write timing pulse of the waveform 378, the transistors 594 and 606 are biased into conduction to pass a write current pulse through the leads 194 and 200. A similar operation is performed by the write control flip flop circuit 584 to apply write control pulses through the leads 180 and 190.

Referring now to the waveforms of FIG. 5, as well as to FIGS. 1 and 2, the operation of the system in accordance with this invention will be explained in further detail by considering the overall timing operation. At a time $t_0$ in response to the initiate pulse of the waveform 372 applied from the computer control system 240, the blocking oscillator 354 is triggered to a state to develop the negative pulse of a waveform 376 on the lead 358. As is well known in the art after the magnetic elements in the blocking oscillator flip flop 354 have saturated, the pulse of the waveform 376 is terminated. In response to signals applied from the computer control system 240 through the composite lead 238, the flip flop 234 and 236 have been set prior to time $t_0$ to binary states for addressing a selected lead 126, 128, 130 or 132. At the same time, similar flip flops in the Y address register 222 have been set to binary states to address one of the leads 114, 116, 118 or 120.

In response to the timing pulse of the waveform 376, the transistor 350 is biased into conduction and the signals of the waveforms 558 and 556 are applied to the collectors of the respective transistors 350 and 364. Because of the positive signal on the lead 244 and the negative signal on the lead 246 as determined by the state of the flip flop 234, the emitter follower transistor 270 is biased into increased conduction to apply the negative potential to the center tap of the winding 316. At the same time, a positive potential is applied to the center tap of the winding 318. Also, in response to the stored state of the flip flop 236, the transistor 280 is biased into increased conduction to apply a negative potential to the center tap of the winding 322. A positive potential is applied to the center tap of the winding 320.

Also, at time $t_0$ the positive pulse of the waveform 558 and the negative pulse of the waveform 556 respectively applied to the collectors of the transistors 350 and 364 biases the transistor 340 into conduction. The positive and negative pulses of the waveforms 440 and 441 are applied to the collectors of the respective transistors 340 and 342. At the same time, the positive and negative pulses of the respective waveforms 443 and 445 are applied to the collectors of the respective transistors 344 and 346. The sequence of positive and negative pulses during the read and write portions of the cycle at the collectors of the transistors 340 and 342 and of the transistors 344 and 346 is determined by appying the negative potential to the center taps of the windings 316 and 322. The negative differentiated pulse of the waveform 560 is applied to the base of the transistor 536 at time $t_0$. The transistor 536 is biased into conduction and applies a pulse of the waveform 571 across the winding 324 and a pulse of the waveform 581 across the winding 326. After the inversion of the winding 324, the reference level of the pulse of the waveform 491 is biased at +5 volts and the reference level of the pulse of the waveform 493 is biased at −5 volts, so that only the winding 454 is energized in response to the ground level of the negative pulse. The diode 500 is then biased into conduction. Thus, as previously discussed, the diode 500 is selected to be conductive and in combination with the signal developed across the winding 446 the signal of the waveform 418 is applied to the selection lead 128. It is to be noted that simultaneously a similar pulse of the waveform 121 except positive is being formed by the Y line driver 230 and applied to a selected lead such as 116.

Shortly after time $t_0$ in response to the large negative spike 838 of the waveform 418 and the large positive spike 840 of the waveform 121, the selected saturating reactor 150 is rapidly driven into saturation as shown by the curve 832 of FIG. 6, so that a very low impedance is presented to current flowing thereto. Thus, a short period after time $t_0$, a full amplitude current pulse indicated by the waveform 790 flows through the lead 80. In response to the current pulse of the waveform 790, the selected cores which are in a stored binary "one" state are switched to the opposite state to form a sense signal of the waveform 818, which for example may be applied to the lead 214. The cores in the "one" state are switched with a magnetomotive force resulting from three halves of normal switching current. It is to be noted that unselected saturating reactors such as 148, 152, 154, 140, 162 and 172 are not saturated by the spikes 838 or 840 or by the steady state half voltage applied thereacross, during the period between times $t_0$ and $t_1$.

At time $t_1$ as controlled by the blocking oscillator 354, the timing pulse of the waveform 376 rises in potential to terminate the pulses of the waveforms 418 and 121. However, the selection of lead 120 and of the word element 32 does not change because this selection is determined by the binary states of the flip flops 234 and 236, and similar flip flops in the Y address register 222.

Between times $t_1$ and $t_2$, a period may be provided for circuit recovery such as discharge of stray capacitance elements. However, it is to be noted that the period between times $t_1$ and $t_2$ may be decreased to a very small amount in accordane with the principles of this invention.

At time $t_2$ which is the start of the write portion of the read and write cycle as determined by the delay time of the delay line 368, the negative signal of the waveform 378 falls in potential to bias the transistor 364 into increased conduction and the transistor 350 into decreased conduction. Thus, the polarity relation across the primary winding 312 is reversed as shown by the waveform 558 and 556. The polarity relation across the windings 316 and 322 and across the windings 320 and 322 are also reversed. The polarity relations across the windings 324 and 326 reverse and in combination with a positive spike of the waveform 581, a positive pulse of the second pulse of the waveform 493 is applied to the center tap of the winding 452. The positive pulse of the waveform 491 is applied to the center tap of the winding 454 to bias all diodes connected thereto non-conductive. Thus, the diode 496 is biased into conduction and in response to a positive signal similar to the positive portion of the waveform 493 combining with the signal across the winding 446, the positive pulse of the waveform 418 is applied to the selection lead 128. As the selecting saturating reactor 150 rapidly goes into its saturated low impedance condition, a write select current pulse of the waveform 790 is applied through the lead 180 in the opposite direction from the previously discussed read current pulse. Thus, the full amplitude current pulse of the waveform 790 overcomes the D.C. bias current and changes the state of all the cores 58 and 60 to the reverse bias condition of the point 826 (FIG. 4). Also, shortly after time $t_2$, the write pulse of the waveform 830 is applied through the lead 200, for example, from the write control circuit 582 for writing a "one" into the core 58. The negative pulse of the waveform 620 for writing a binary "one" may be applied from the computer control system 240 to the write control flip flop circuit 582 between times $t_0$ and $t_1$ so that the write current pulse of the waveform 830 is developed at time $t_2$ in response to the timing pulse of the waveform 378. It is to be noted that the regenerate pulse of the waveform 690 of FIG. 1 may be applied to the diode 688 shortly after time $t_0$ for writing the previously interrogated information back into the memory between times $t_2$ and $t_3$. If a "one" is not desired to be written into the core 60, a write pulse is not applied to the lead 190, and the negative pulse of the waveform 620 is not applied to the write control circuit 582 between times $t_0$ and $t_1$. Thus, the core in which a "one" is to be written such as the core 58 changes to the lower level of the curve 812 of FIG. 4 and upon removal of the selection current pulse of the waveform 790 and the write pulse of the waveform 830, the core changes to the stable "one" state of the point 816.

At time $t_3$, the delayed timing pulse of the waveform 378 is terminated and the selection pulses of the waveforms 418 and 121 are terminated. As a result, the selection current of the waveform 790 is also terminated. Because the write timing pulse of the waveform 378 is applied to the diode 592 through the lead 588, the write pulse of the waveform 830 is also terminated at time $t_3$. The period between times $t_0$ and $t_1$, as well as between times $t_2$ and $t_3$, are selected so that the unselected saturating reactor such as 152 to which a half potential is applied are unable to saturate and remain in their high impedance condition.

Between times $t_3$ and $t_4$, a period may be provided for circuit recovery and may be relatively short as discussed above. At time $t_4$ in response to the initiate pulse of the waveform 372, the timing pulse of the waveform 376 again falls in potential and is applied to the base of the transistor 350. Similar to the discussion above, the differentiated pulse of the waveform 560 is applied to the base of the transistor 536 to develop the spikes of the waveforms 581 and 571. Thus, driving pulses similar to the waveforms 418 and 121 are applied to the driving leads as selected by the setting of the address register flip flops 234 and 236, as well as by similar flip flops in the Y address register 222. It is to be noted that the address register flip flop such as 234 and 236 may be set between times $t_3$ and $t_4$. The current pulse of the waveform 790 flows through the selected leads such as the word line 80 between times $t_4$ and $t_5$, switching those cores to provide reading of the selected word elements that are storing a binary one. Because the operation proceeds in a similar manner, it will not be explained in further detail.

In a ferrite core normally used in a conventional half current select memory system, a sensed signal of 50 millivolts may be expected. However, with the same type cores utilized in the three halves current select system in accordance with this invention, a signal of approximately 300 millivolts is developed on the lead 214, for example. This large amplitude sense signal results because the sense signal of the waveform 818 is a function of the rate of flux change and very rapid switching is provided by the additional switching current in accordance with this invention. The switching time in normal use of the above-mentioned ferrite core may be 1.2 microseconds while in the arrangement of the invention, the same core may be switched in less than .2 microseconds, thus providing a relatively high speed of operation.

The output transformer 700 has a highly balanced performance to substantially suppress the disturbance in the system caused by the write current reaching the sense amplifier. Thus, the sense amplifier develops relatively small output signal when a "zero" is being written into a core and relatively large output signals when a "one" is being written into a selected core. The amplitude ratio between these two signals will be in the range of one compared with 5 to 10. Therefore, the output signal during writing can be used as a redundancy check to compare with the input information in the computer control system 240.

The saturating reactors may be formed by wrapping turns around a ferromagnetic core. The number of turns times the flux change from the initial state to the saturated state times $\times 10^{-8}$ yields a number called volt seconds. If in this system the number of bits in a word when switched produces a voltage across the word line that varies between E and a much smaller E′ as determined by the number of cores switched and if the switching for both read and write in these cores is some period $\gamma$, sufficient resistance must be placed in the word line. This resistance must be sufficient to permit the variations in induced word line voltage from causing a substantial regulation of the word line current source. If these conditions are fulfilled, the volt seconds of the saturable or saturating reactors should equal at least $4 \times E \times \gamma$. The resistance in the word line under these circumstances may be selected to cause the resistive voltage drop to be approximately 7×the induced voltage. This resistance in the word line may be provided, for example, by selecting the material thereof or by adding a resistor therein.

All of the wires of the array such as the word line, the write line and the sense line, may be made of a metal having such a resistivity that with the selected diameters and proximity to other wires, the resistivity will cause the otherwise resonant stray capacitance and self inductance developed in the network by the wires to be substantially critically damped. This selected resistance of the wires of the array 20 provides a very small power loss because the product of energy and time is substantially unchanged for the array. In this arrangement in accordance with this invention, sensed signals as well as the driving signals are rapidly damped to eliminate oscillations that may require a slower time of operation. It is to be noted that this resistance in the sense lead may cause a small amount of heat to be formed.

Thus, there has been described an improved high speed memory system that utilizes an improved current select ratio so that selected cores are rapidly switched to their opposite state. Because of this rapid switching of cores, the sensed output signals is of a relatively large amplitude, eliminating complicated sense amplifier arrangements and possible errors. Selection in the matrix is provided by saturating reactors in each word line to eliminate the conventionally complicated diode selection networks. The system passes current pulses through only the cores of the selected word during reading so that undesired noise signals are substantially eliminated. An improved selection pulse forming network is provided for applying suitable pulses to the saturating reactors, so that switching is rapidly initiated.

What is claimed is:

1. A system for selecting one of a plurality of columns of magnetic elements, said magnetic elements having characteristics for being switched between first and second magnetic states in response to a magnetic force developed from a current pulse having a minimum of a full amplitude comprising a plurality of first conductors each passing through a column of magnetic elements and magnetically coupled thereto, a plurality of second conductors each magnetically coupled to a corresponding magnetic element in each of said plurality of rows, a plurality of third conductors each magnetically coupled to corresponding magnetic elements of each of said plurality of rows, means coupled to both ends of said plurality of first conductors for applying read or write select current pulses of a full amplitude through a selected first conductor, said read and write select current pulses flowing in opposite directions, a source of bias current coupled to each of said plurality of second conductors for passing a steady state half amplitude bias current therethrough, and a source of write current pulses of full amplitude coupled to each of said plurality of third conductors for applying a write current pulse through selected third conductors, one of said read select current pulses and said bias current providing a combined magnetic force developed from a three halves amplitude current to switch all magnetic elements of a selected row of magnetic elements in a first magnetic state to a second magnetic state, one of said write select current pulses, said bias current and said write current pulse applied to selected third conductors providing a combined magnetic force developed from a three halves amplitude current to switch magnetic elements coupled to said selected third conductors in a selected row from said second magnetic state to said first magnetic state.

2. A system for selecting and switching a magnetic core, said core having characteristics for being switched between first and second magnetic states in response to magnetomotive forces developed by a full amplitude current or greater comprising first, second and third conductors magnetically coupled to said core, saturating reactor means coupled in series with said first conductor, said saturating reactor means saturating to a low impedance condition in a first interval of time in response to a full voltage thereacross and in a second interval of time in response to a half voltage thereacross, a source of half voltage read pulses and write pulses of opposite polarity coupled to both ends of said first conductor for selectively applying said read or said write pulses to opposite ends of said first conductor or applying one of said read or said write pulses to one end of said first conductor, said read and write pulses each having a time of duration greater than said first interval of time and less than said second interval of time, said saturating reactor means responding to said read or said write voltage pulses applied to both ends of said first conductor to pass read select or write select full amplitude current pulses through said first conductor in a selected first or second direction, a source of D.C. bias current coupled to said second conductor for passing a half amplitude current therethrough, a source of a write current pulse coupled to said third conductor for applying a full amplitude write current pulse therethrough, said read select current pulse, said D.C. bias current providing a magnetomotive force developed from three halves amplitude current to switch said core from said first state to said second state and said write select current providing a magnetomotive force resulting from a one half amplitude current pulse after overcoming the half amplitude of said D.C. bias current so that said write current pulse switches said core to said first magnetic state in response to the magnetomotive force resulting from three halves amplitude current.

3. A system for selecting and switching magnetic cores arranged in a plurality of columns, said cores having characteristics for being switched between first and second magnetic states in response to a magnetic force developed by a full amplitude current or greater comprising a plurality of first conductors each magnetically coupled to the cores in a different column, second and third conductors each magnetically coupled to different corresponding cores in each column, a plurality of saturating reactors each serially coupled in a different one of said first conductors, a source of read and write voltage pulses coupled to opposite ends of said first conductors for selectively applying said read or write pulses to both ends of a selected first conductor and to one end of unselected first conductors, the saturating reactor in said selected first conductor saturating to pass a full amplitude read or write select current pulse therethrough in a first or a second direction to develop a magnetic force, a source of D.C. bias current coupled to said second conductor for passing a half amplitude current therethrough to develop a magnetic force in the same direction as the read current pulse during reading, a source of a write current pulse coupled to said third conductor for applying a full amplitude write current pulse therethrough during writing to develop a magnetic force in the same direction as said write select current pulse and in the opposite direction from that developed by said D.C. bias current, said read select current pulse and said D.C. bias current providing a magnetic force developed from three halves amplitude current for switching the cores in the selected column from said first state to said second state during reading and said write select current pulse, said D.C. bias current and said write current pulse providing a magnetic force developed from three halves amplitude current for switching the cores in the selected column to said first magnetic state during writing.

4. A memory system comprising a plurality of cores arranged in rows and columns with said columns of cores being divided into groups, each core having characteristics for switching to an opposite magnetic state requiring a minimum of a magnetic force developed by a full amplitude current, a plurality of selection leads each magnetically coupling the cores in a different column, a plurality of write leads each magnetically coupling a core in each of said plurality of columns, a plurality of sense leads each magnetically coupling a core in each of said plurality of columns, a plurality of saturating reactors each serially coupled in a different selection lead, first selection means having a plurality of leads each coupled to the first end of the selection leads of a different group, second selection means having a plurality of leads each coupled to the second end of a selection lead of each of said groups, with each lead coupled to a different selection lead of each group, said first and second selection means respectively applying voltage pulses of opposite polarity to selected ones of the leads of each so as to apply pulses of opposite polarity to opposite ends of a selected saturating reactor so that a full amplitude current selection pulse flows therethrough, a source of write current pulses coupled to said plurality of write leads for passing a full amplitude write current pulse through selected write leads, sensing means coupled to each of said plurality of sense leads for passing a one half amplitude bias current therethrough and for responding to signals developed by switched cores, during reading said selected saturating reactor saturating in response to said voltage pulses of opposite polarity to pass the full amplitude current selection pulse through the selection lead of the selected column in a first direction, said bias current passing half amplitude current through said sense lead in the first direction so that the cores in the selected column respond to a magnetic force developed by a three halves amplitude switching current, during writing said selected saturating reactor saturating in response to voltage pulses of opposite polarity applied to opposite ends of the selected saturating reactor to pass the full amplitude current selection pulse through the selection lead of the selected column in a second direction developing a magnetic force opposite to that developed by said bias current, said full amplitude write current pulses applied to selected cores develop a magnetic force in the same direction as the selection pulse to switch selected cores with a magnetic force developed by three halves amplitude current.

5. A memory system comprising a plurality of cores arranged in rows and columns with said columns of cores being divided into groups, each core having characteristics for switching to an opposite magnetic state in response to a minimum of magnetic force developed by a full amplitude current, a plurality of selection leads each magnetically coupling the cores in a different column, a plurality of write leads each magnetically coupling a core of each column, a plurality of sense leads each magnetically coupling a core in each column, a plurality of saturating reactors each coupled in series in a different selection lead, timing means, row address means and column address means coupled to said timing means, row driver means and column driver means respectively coupled to said row and column address means for respectively applying first read voltage pulses and write voltage pulses and second read voltage pulses and write voltage pulses to selected address leads, each of said respective first and second read pulses and of said first and second write pulses being of opposite polarity and each of said first and second read pulses and of said first and second write pulses being of opposite polarity, each of the address leads of said row driver means coupled to the first ends of the selection leads of a different group, each of the address leads of said column driver means coupled to second end of one selection lead of each of said groups, in response to said first and second read pulses the saturating reactor in the selected selection lead rapidly saturates to apply a write select current pulse through the corresponding cores in a first direction with said saturating reactors to which a first or a second pulse is applied to one end remaining unsaturated, in response to said first and second write pulses said saturating reactor in the selected selection lead saturating to pass a write select current pulse therethrough a second direction, said saturating reactors in the selection leads to which a write select pulse is applied to one end remaining unsaturated, said read and write select current pulses having a full amplitude, source of write current pulses coupled to said timing means and to said plurality of write leads for passing a full amplitude bias current therethrough, sensing means coupled to said plurality of sense leads for passing a one half amplitude bias current therethrough and for responding to sense signals developed by switched cores, during reading said selected saturating reactor rapdily saturating in response to said first and second read voltage pulses of opposite polarity to pass the full amplitude read select current pulse through the selected lead in a first direction, said bias current passing through said sense lead so that the cores in the selected column respond to a magnetic force developed by a three halves amplitude switching current to develop sense signals in the sense leads, during writing said saturating reactor rapidly saturating in response to said first and second write voltage pulses of opposite polarity applied to opposite ends of a selected saturating reactor to pass the full amplitude write select current pulse through the corresponding selection lead in a second direction developing a magnetic force opposite to that developed by said bias current, said full amplitude write current pulses in selected write leads developing a magnetic force in the same direction as the write select current pulse to switch selected cores with a magnetic force developed by three halves amplitude current.

References Cited by the Examiner

UNITED STATES PATENTS

| | | | |
|---|---|---|---|
| 2,856,596 | 10/1958 | Miller | 340—174 |
| 2,900,624 | 8/1959 | Stuart-Williams | 340—174 |
| 2,914,748 | 11/1959 | Anderson | 340—174 |
| 2,931,017 | 3/1960 | Bonn | 340—174 |
| 3,196,413 | 7/1965 | Teig | 340—174 |

BERNARD KONICK, *Primary Examiner.*

IRVING L. SRAGOW, *Examiner.*

R. J. McCLOSKEY, M. S. GITTES, *Assistant Examiners.*